United States Patent [19]

Fujiwara

[11] Patent Number: 5,423,987
[45] Date of Patent: Jun. 13, 1995

[54] SCUM REMOVAL APPARATUS

[76] Inventor: Michihiro Fujiwara, 13-37-1006, Mikuni Honmachi 2-chome, Yodogawa-ku, Osaka-shi, Osaka 532, Japan

[21] Appl. No.: 150,208
[22] PCT Filed: Aug. 13, 1992
[86] PCT No.: PCT/JP92/01038
§ 371 Date: Dec. 13, 1993
§ 102(e) Date: Dec. 13, 1993
[87] PCT Pub. No.: WO92/01038
PCT Pub. Date: Oct. 28, 1993

[30] Foreign Application Priority Data

Apr. 14, 1992 [JP] Japan ............................ 4-036050 U

[51] Int. Cl.$^6$ ............................................ B01D 21/24
[52] U.S. Cl. ........................................ 210/525; 210/526
[58] Field of Search .................. 210/122, 242.1, 242.3, 210/525, 526, 527, 528

[56] References Cited

U.S. PATENT DOCUMENTS

| | | | |
|---|---|---|---|
| 3,081,879 | 3/1963 | Schroeder et al. | 210/525 |
| 4,136,030 | 1/1979 | Seiko et al. | 210/242.3 |
| 4,268,394 | 5/1981 | Wolfe | 210/525 |
| 4,277,334 | 7/1981 | Ruidisch et al. | 210/525 |
| 5,057,219 | 10/1991 | Fujiwara | 210/525 |
| 5,087,380 | 2/1992 | De'Toffoli | 210/242.1 |
| 5,200,079 | 4/1993 | Schwartz et al. | 210/528 |

FOREIGN PATENT DOCUMENTS

| | | |
|---|---|---|
| 2610499 | 9/1977 | Germany . |
| 9201328 | 5/1992 | Germany . |
| 607830 | 3/1985 | Japan . |
| 1124288 | 8/1989 | Japan . |
| 253191 | 4/1990 | Japan . |
| 390689 | 9/1991 | Japan . |
| 3115093 | 11/1991 | Japan . |

*Primary Examiner*—Christopher Upton

[57] ABSTRACT

A scum removal apparatus operable in association with a movable member operating within a sewage treatment pool is provided with a trough, a weir member and a transmission mechanism. The trough is fixed in position, and the transmission mechanism transmits a force from the movable member to the weir member to cause the latter to move up and down with respect to a fluid surface level. When the weir member is sunken, the scum is drawn into the trough, while when the weir member floats above the fluid surface level, the drawing of the scum into the trough is interrupted.

Support of the weir member is carried out through a rotary shaft and the weir member is employed in the form of an elongated member having an elliptical cross-section so that the drawing of the scum can be carried out smoothly and stably with the transmission mechanism simplified in structure.

Sealing between the weir member and the trough is assuredly and simply achieved by a fixed-type sealing means on the side of the trough and end plates of the weir member.

8 Claims, 19 Drawing Sheets

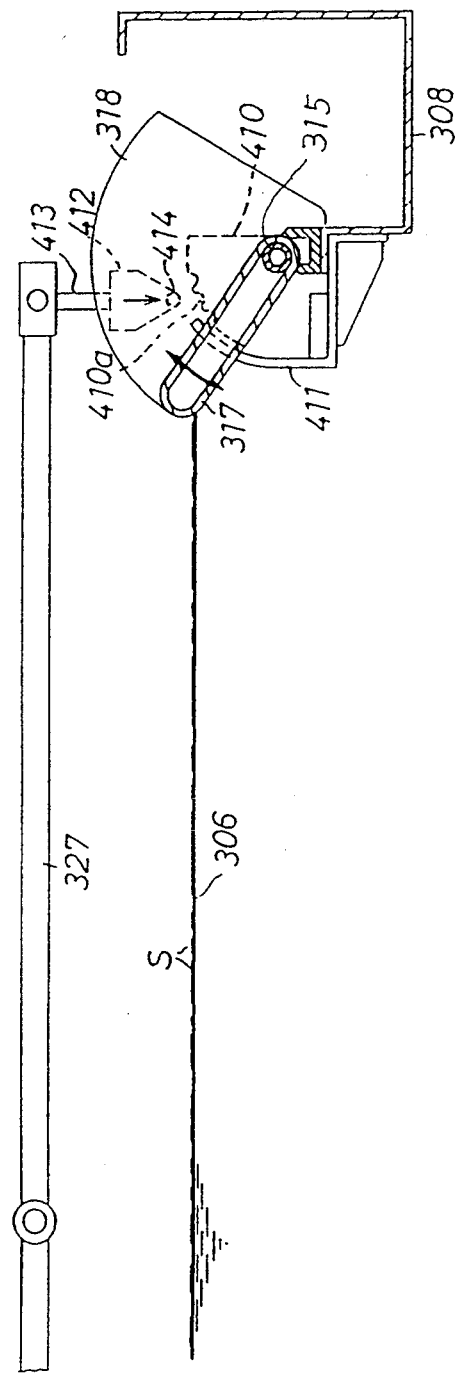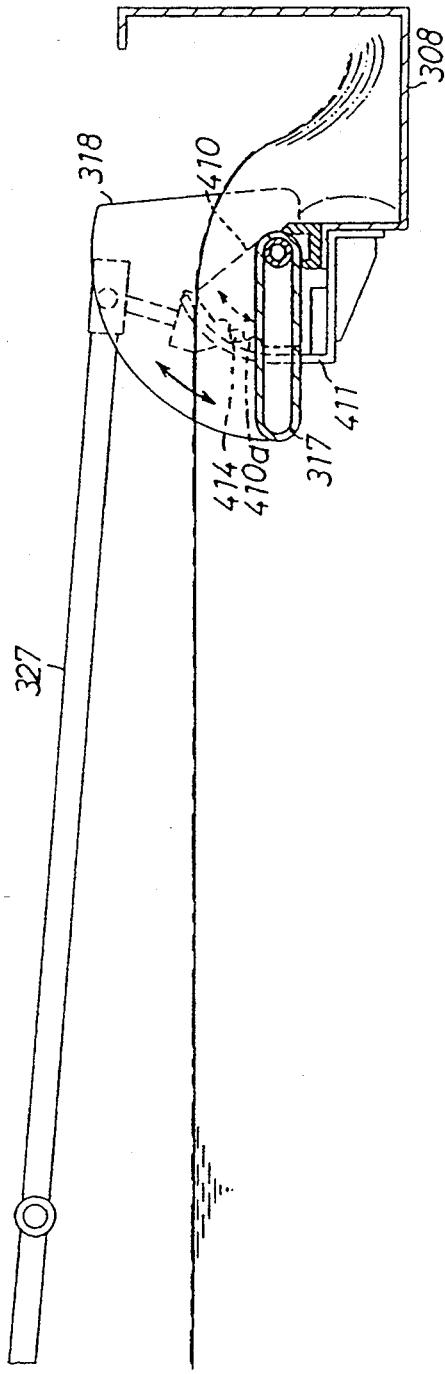
Fig. 9
Fig. 10

SCUM REMOVAL APPARATUS

FIELD OF THE INVENTION

The present invention generally relates to a scum removal apparatus for efficiently removing scum floating in a sewage treatment pool and, more particularly, to the simplified scum removal apparatus of a type effective to efficiently remove scum by the utilization of a driving power generated by a movable member installed in the sewage treatment pool and without relying on a dedicated driving power.

BACKGROUND ART

FIGS. 25 and 26 of the accompanying drawings illustrate the scum removal apparatus suggested by the inventor of the present invention. A generally rectangular sewage settling pool is provided with a plurality of, for example, four, sprocket shafts 200 extending in a widthwise direction of the sewage settling pool, a pair of sprocket wheels 201 mounted on each of the sprocket shafts 200 and generally endless, left-hand and right-hand chains trained around the sprocket wheels 201 on the sprocket shafts 200. In the suggested scum removal apparatus, some or all of the flights 203 secured to the chains 202 are driven together with the chains 202 to draw and remove the scum floating on the water surface in the sewage settling pool.

The scum removal apparatus includes a trough 205, a guide support sheet 206, a weir member 208 and a transmission mechanism 209. The trough 205 is in the form of an elongated member of a generally U-shaped cross-section opening upwardly and frontwardly and is fixedly disposed in the sewage settling pool so as to extend in the widthwise direction of the sewage settling pool.

The guide support sheet 206 is a band of rubber material of a length corresponding to that of the trough 205 and secured at one front side portion to an upper edge of a front wall of the trough 205 with the opposite rear side portion thereof protruding frontwardly from the front wall of the trough 205 so as to undergo undulation by the effect of its elastic deformation.

The weir member 208 is in the form of a generally elongated member having a front portion of a generally fight triangular hollow cross-section and a rear portion of a generally rectangular cross-section and has a base portion secured to the front side portion of the guide support sheet 206 so as to protrude outwardly therefrom so that, while supported by the guide support sheet 208, the weir member 206 can undergo a wavy motion above and below the fluid surface level 207 of sewage in the sewage settling pool.

It is the transmission mechanism 209 that drive the weir member 208 to move up and down with respect t the fluid surface level 207 in the sewage settling pool. This transmission mechanism 209 includes a rotary support shaft 210, a drive arm 211, and an operating arm 212. The rotary support shaft 210 is supported so as to extend widthwise of the sewage settling pool whereas the drive arm 211 is supported so as to extend from one end portion of the rotary support shaft 210 in a frontward direction substantially perpendicular to the rotary support shaft 210. The operating arm 212 is supported so as to extend in a direction counter to the direction of extension of the drive arm 211 and towards the trough 205 and is employed for each of the left-hand and right-hand sides of the sewage settling pool for the purpose of a stabilized operation. The drive arm 211 has a front end portion provided with a follow-up member 213.

The follow-up member 213 has a cam face defined at a bottom thereof, which cam face is constituted by two hill areas 213a and 213c and a dale area 213b positioned between these hill areas 213a and 213c. It is a roller (a drive unit) 214, protruding outwardly from one end of each flight (mud dragging member) 203, that drives the follow-up member 213 to actuate the drive arm 211 and the operating arm 212 to move the weir member 208 up and down with respect to the fluid surface level 207 of sewage in the sewage settling pool. This roller 214 is supported by a bracket secured to one end of the follow-up member 213 associated with each flight 203. Reference numeral 220 shown in FIGS. 25 and 26 represents a side seal (a sealing means) disposed between each side end of the weir member 208 and the adjacent side end of the trough 205 for avoiding a leakage of scum and water. This side seal is made of rubber material and is corrugated into a bellows between each side end of the weir member 203 and the adjacent side end of the trough 205 so that it can selectively expand and contract due to its elasticity in response to an undulating motion of both of the weir member 208 and the guide support sheet 206.

The suggested scum apparatus shown in FIGS. 25 and 26 operates in the following manner.

When a drive motor (not shown) installed on a ground outside the sewage settling pool is powered, the chains 202 are driven so that the flights 203 coupled with the chains 202 are driven so as to slowly circulate along a generally rectangular path as indicated by the arrows in FIGS. 25 and 26. The flights 203 being circulated successively scrape the sediment at the bottom of the sewage settling pool to guide it to a pit 221 in the bottom of the sewage settling pool so that the sediment so guided into the pit 221 can be subsequently discharged by a suitable pump (not shown) to the outside of the sewage settling pool.

Some of the flights 203 moving along a path adjacent the fluid surface level 207 during the circulatory motion thereof successively push the follow-up members 213 by means of the rollers 214. The rollers 214 are then brought into engagement with the follow-up members 213 in a first stage, first contacting the hill area 213a, then contacting the dale area 213b and finally contacting the hill area 213c, to thereby move the follow-up members 213 up and down. When each roller 214 is brought into engagement with the hill area 213a of the respective follow-up member 213, both of the follow-up member 213 and the associated drive arm 211 are lifted a considerable distance and, at the same time, the associated operating arm 212 is lowered, causing the weir member 208 to be pushed beneath the fluid surface level 207 by means of a rod 224.

At this time, the scum S floating on the top surface of the sewage, regardless of the size thereof, are guided into the trough 205 by the flow of water and is then discharged out from the trough 205. When each roller 214 is however brought into engagement with the dale area 213a of the respective follow-up member 213 in a second stage, both of the follow-up member 213 and the drive arm 211 are temporarily lowered while the associated operating arm 212 is lifted. Consequently, the weir member 208 having been lowered beneath the fluid surface level 207 is elevated a slight distance and, therefore, the amount of water component flowing over the weir member 208 into the trough 25 becomes small.

Although the amount of the water component flowing over the weir member 208 is small, the velocity of flow of the water component becomes so high as to result in an increase of the force with which the scum S is drawn towards the trough 205. Therefore, scum lumps, small and large in size and/or floating near and a substantial distance away from the trough 205, can be smoothly drawn close towards the trough 205.

On the other hand, when each roller 214 is subsequently brought into engagement with the hill area 213c of the respective follow-up member 213 in a third stage, both of the follow-up member 213 and the drive arm 211 are again elevated and the associated operating arm 212 is lowered. Once this occurs, the weir member 208 is lowered to guide a substantial amount of the scum S, drawn close towards the trough 205 in the manner described above, into the trough 205. Thus, since the follow-up member 213 moves so as to perform the three stages, the draw of the scum S to throw it into the trough 205 can be performed with considerably high efficiency.

However, the above described scum removal apparatus has been found having the following problems.

Since the weir member 208 is supported by the guide support sheets 206 made of rubber material, the weir member 208 is held in a instable condition and, accordingly, the use of the plural operating arms 212 and also the use of the rotary support shaft 210 having a length corresponding to the width of the sewage settling pool are required, making the scum removal apparatus as a whole complicated in structure and costly to assembly. Also, since the operating performance of the weir member 208 is not consistent during the operation thereof, the amount of scum drawn thereby is not always constant.

Since the weir member 208 is in the form of a generally elongated member having a front portion of a generally right triangular hollow cross-section and a rear portion of a generally rectangular cross-section and is of one-piece construction, the molding thereof is very complicated and requires a high cost. Also, there is a problem in that, since the top of the front portion of the weir member 208 protrudes upwardly, some of the scum lumps tending to ride over the front portion of the weir member 208 is often entangled, thereby failing to ride over the front portion of the weir member 208. Also, since the rear portion of the weir member 208 is substantially in the form of a rectangular-sectioned plate, some of the scum lumps having ridden over the front portion of the weir member 208 tend to gather around the rear portion of the weir member 208 to such an extent that the weir member 208 may fail to operate properly and that an outer appearance tends to be spoiled.

Also, since the side seal 220 is in the form of bellows, not only does it require a high cost, but the attachment thereof is also complicated considerably.

Accordingly, the present invention has been devised to substantially eliminate the problems discussed above.

An object of the present invention is to make it possible to manufacture, at a reduced cost, the scum removal apparatus as a whole which is simple in structure and wherein the weir member can operate stably even though the operating arm employed is a single short rotary support shaft and also to stabilize the operating performance of the weir member so that the amount of scum drawn can be maintained constant.

The molding of the weir member can be achieved simply and at a reduced cost, and can be so designed as to allow the scum to easily ride over the weir member. Design has been made to avoid the scum from gathering around the weir member. Also, design has been made to avoid the scum from being accumulated on the way to thereby render the weir member to be comfortable to look at.

Design has also been made to render the seal means to be simple in structure and inexpensive and to permit the attachment thereof to be performed very simply.

DISCLOSURE OF THE INVENTION

The present invention is featured in that, in a scum removal apparatus which comprises a generally U-sectioned trough fixedly installed in a sewage treatment pool, such as a sewage settling pool, with a lower portion thereof submerged beneath a fluid surface level and with an upper portion thereof emerging upwardly above the fluid surface level, said trough having an opening defined at one side thereof, said trough being operable to discharging scum and a water component, which have been introduced thereinto through the opening; a weir member provided adjacent the opening of the trough so as to undergo a rocking motion with an upper side portion thereof moving up and down with respect to the fluid surface level for guiding and interrupting the flow of the scum and the water component into the trough; and a transmission mechanism for transmitting a force to the weir member to cause the weir member to undergo the rocking motion and including a follow-up member adapted to be actuated in contact with a drive unit provided in each of flights within the treatment pool, one side of the trough adjacent the opening is provided with a rotary shaft extending parallel to the fluid surface level to permit the weir member to move up and down, said weir member being a generally elongated member having an elliptical cross-section.

Also, in the above described scum removal apparatus, the present invention is featured in that one side of the trough adjacent the opening is provided with a rotary shaft extending parallel to the fluid surface level to permit the weir member to move up and down, said weir member being a generally elongated member having an elliptical cross-section, and that said weir member has its opposite ends provided with respective end plates while, on the side of the trough, sealing means are provided which are capable of permitting a movement in contact with the end plates.

BRIEF DESCRIPTION OF THE DRAWINGS

FIG. 9 is a fragmentary side sectional view showing another example of the scum removal apparatus of the water-level follow-up type;

FIG. 10 is a fragmentary side sectional view of the scum removal apparatus of the water-level follow-up type shown in FIG. 9, showing a condition during the drawing of the scum;

BEST MODE FOR CARRYING OUT THE INVENTION

To facilitate a better understanding of the present invention, the present invention will be described with reference to the accompanying drawings.

Figure 3:
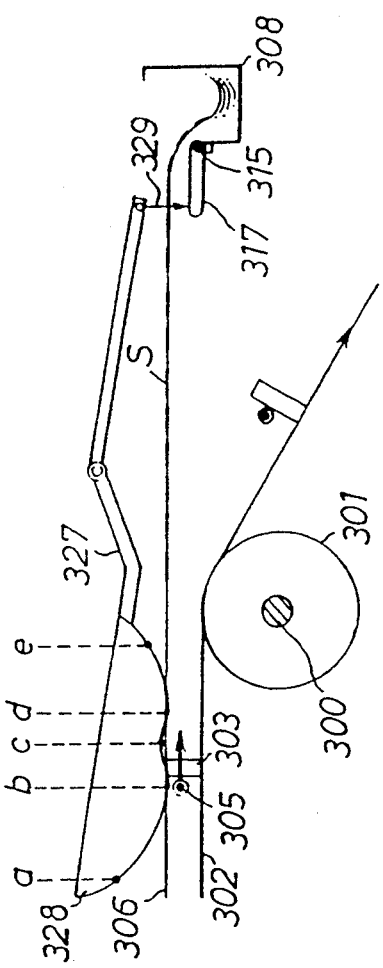
FIG. 3 is a schematic side view of a portion of the scum removal apparatus shown in FIG. 1, showing a manner of removal of the scum.

FIGS. 1 to 5 illustrate one embodiment of the present invention. In this embodiment, there is shown a sewage settling pool (a treatment pool) rectangular in shape as viewed from above, and this rectangular sewage settling pool is provided, as shown in FIG. 3, with a plurality of, for example, four, sprocket shafts 300 supported so as to extend in a widthwise direction of the sewage settling pool, a pair of sprocket wheels 301 rigidly mounted on each of the sprocket shafts 300 and generally endless left-hand and right-hand chains 302 trained around the respective sprocket wheels 301 on each sprocket shaft 300. A plurality of flights 303 are mounted on the endless chains 302 in a substantially equally spaced relationship around the chains 302 so that the flights 303 can undergo a circulatory motion along a generally rectangular path together with the chains 302.

A bracket 304 is secured to one of opposite ends of all or some of the flights 303 (that end over the flight 303 shown in FIG. 1 so far as the illustrated embodiment is concerned) and carries a roller support shaft so as to extend outwardly therefrom with a roller 305 mounted on a free end of such roller support shaft. This roller 305 on all or some of the flights 303 can undergo a circulatory motion along a generally rectangular path including an upper horizontal path component adjacent a fluid surface level 306 of the sewage in the sewage settling pool extending in a direction shown by the arrow in FIG. 1, a diagonally downwardly lowering path component, a lower horizontal path component extending along the bottom of the sewage settling pool and an elevating path component, before it is brought to a position immediately beneath the fluid surface level 306.

A scum removal apparatus is provided with a trough 308. This trough 308 is of a generally U-shaped cross-section and includes a rear wall 308a, a major portion of which is sunken beneath the fluid surface level 306, but having an upper portions protruding above the fluid surface level 306, a bottom wall 308b positioned beneath the fluid surface level 306, and a front wall 308c of a height lower than that of the rear wall 308a having an upper portion positioned beneath, but adjacent to the fluid surface level 306. A front flange 308d is integrally formed with the front wall 308c so as to protrude frontwardly from the upper portion thereof in a direction opposite to the rear wall 308a.

The trough 308 is of the generally U-shaped cross-section opening upwardly and, also, diagonally frontwardly and is of a length slightly smaller than the width of the sewage settling pool. This trough 308 is fixedly installed in the sewage settling pool with its lengthwise direction oriented widthwise of the sewage settling pool. Opposite ends of the trough 308 are provided with respective end plates 308e. A connecting trough 311 inserted through and fixed in a wall forming the sewage settling pool with its opposite ends protruding outwardly in opposite directions from the wall of the sewage settling pool is bolted to each end plate 308e by means of a flange 311a integral with the connecting trough 311.

The connecting trough 311 is of a generally square cross-section and is used to communicate the troughs 311 in the neighboring sewage settling pools. It is to be noted that the trough 308 is so slightly inclined with one end thereof held at a level higher than the opposite end thereof that fluid can flow from the higher end of the trough 308 towards the lower end thereof by the effect of a gravitational force. This can in practice be accomplished by setting the bottom wall 308b of the trough 308 inclined. Therefore, scum and water component can be gathered having flowed in one direction and then guided to the next succeeding treatment system.

An elongated bottom seal member 312 of a generally U-shaped cross-section made of rubber material is rigidly secured to the front flange 308d by means of an elongated retainer plate 313. This bottom seal member 312 has rear and front wall portions, the rear portion having a height greater than that of the front wall portion. Bearings 314 are fixedly connected to opposite respective ends of the front flange 308d, and a tubular rotary shaft 315 is supported by these bearing 314 so as to extend substantially parallel to the front flange 308d.

A weir member (a float) 317 is supported by the rotary shaft 315 so as to undergo a rocking motion about the longitudinal axis of the rotary shaft 315. The weir member 317 is of a generally fiat tubular configuration having a generally elliptical cross-section and of a length sufficient to extend widthwise of the sewage settling pool. The rotary shaft 317 has front and rear rounded sides with the rotary shaft 315 extending through the rear rounded side thereof. Opposite ends of the weir member 317 have respective end plates 318 rigidly secured thereto with opposite ends of the rotary shaft 315 extending outwardly therethrough to left-hand and right-hand sides.

Each of the end plates 318 is sandwiched between sealing means 320 provided on the trough 308. The sealing means 320 comprises a fixed plate 321 fixed to each end of the trough 308 so as to extend upright and having a gap between left-hand and right-hand portions thereof, fiat rubber seal plates 322 disposed on respective sides of the fixed plate 321, main seals 323 each having one end formed into a tapered lip and seal retainers 324, all of which are fastened together by means of bolts and nuts. The end plates 318 can move from and aft in gaps formed among these elements to avoid any possible leakage of water component from the front.

It is to be noted that the front rounded side of the weir member 317 has a plurality of recesses 317a defined therein so that relatively large scum lumps can be drawn by these recesses 317a the first thing.

Reference numeral 325 represents a bracket secured to a side wall 310 of the sewage settling pool. This bracket 325 has a single operating arm 327 having a generally intermediate portion rotatably connected thereto by means of a rotary support shaft 326 while extending transverse to the rotary support shaft 326. The operating arm 327 has a front free end provided with a follow-up member 328 and also has a rear free end operatively coupled with a rod 329.

Figure 5:
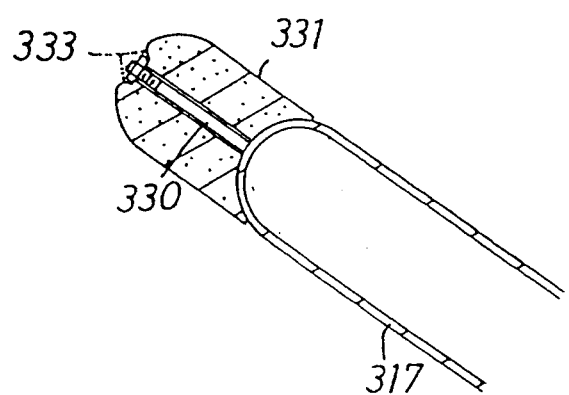
FIG. 5 is a fragmentary sectional view showing an another preferred embodiment of the present invention in which a supplemental element is fitted to a weir member.

It is to be noted that, where the weir member 317 has a relatively small width, an supplemental element 331 may be connected to one or each end of the weir member 317 by means of a bolt 330 threaded thereto through the supplemental element 331 as shown in FIG. 5. In such case, the supplemental element 331 may have its tip provided with sharp projections 333 effective to break the scum S into pieces.

Figure 4:
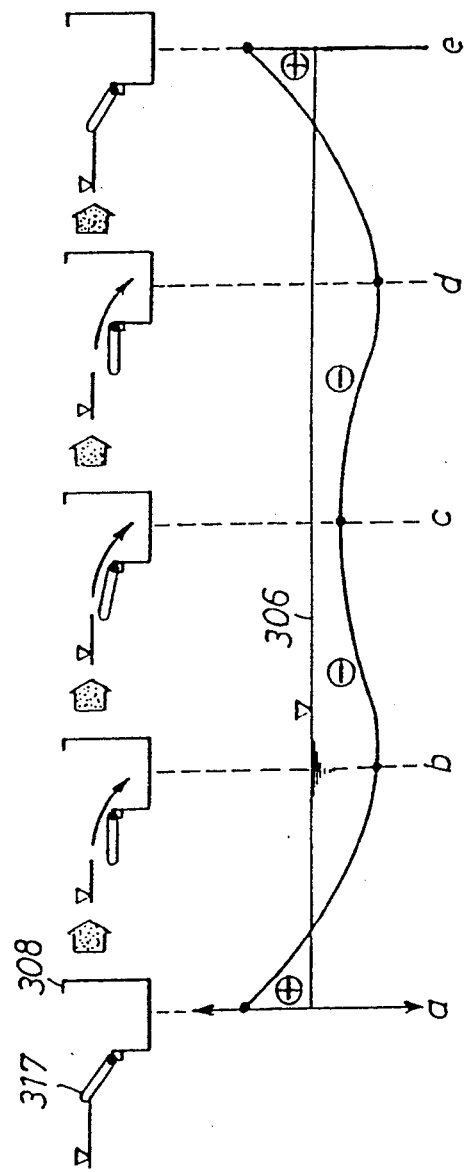
FIG. 4 is an explanatory diagram showing an operating mode of the scum removal apparatus shown in FIG. 1.

The operation of the scum removal apparatus of the above described construction is shown in FIGS. 3 and 4.

Assuming that temporary contact points in the follow-up member 328 are expressed by a, b, c, d and e, from the front to the rear, respectively, by the time the roller 305 is brought into contact with the contact point a of the follow-up member 328, the weir member 317 is positioned still above the fluid surface level 306. However, during a period subsequent to the contact of the roller 305 with the contact point a and prior to the contact of the roller 305 with the contact point b, the follow-up member 328 is lifted while the weir member 317 is lowered beneath the fluid surface level 306 by means of the operating arm 327 and the rod 329. When the roller 305 relatively rolls over to the contact point b, the weir member 317 is held substantially horizontally to draw a relatively large amount of the scum S.

When the roller 305 rolls from the contact point b over to the next contact point c in the follow-up member 328, the follow-up member 328 is conversely lowered a slight distance with the weir member 317 consequently lifted but still beneath the fluid surface level 306 and, in this condition, the amount of water component drawn thereby is somewhat restricted. However, some of the scum S far away from the trough 308 are effectively drawn as described above. When the roller 305 rolls over to the contact point d, the weir member 317 is lowered again to draw a relatively large amount of the scum S. When the roller 305 is subsequently brought into contact with the contact point e in the follow-up member 328, the follow-up member 328 is lowered while the weir member 317 is floated above the fluid surface level 306 with the consequence that the drawing of the scum S is temporarily interrupted. During this condition, the seal is assuredly and simply achieved by the bottom seal 312, the sealing means 320, the end plates 318 and others.

Figure 1:
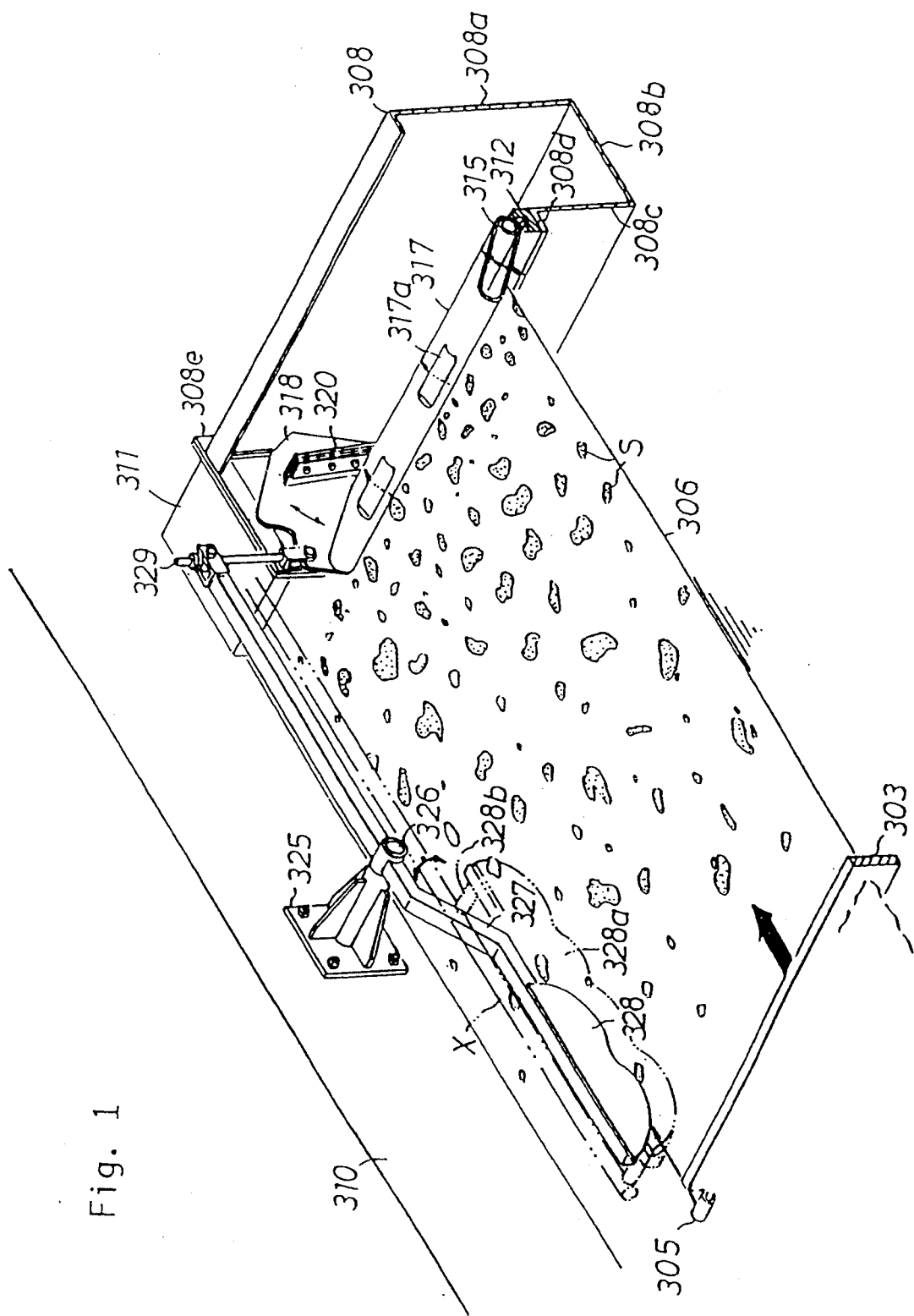
FIG. 1 is a fragmentary perspective view of a scum removal apparatus according to a preferred embodiment of the present invention.
Figure 2:
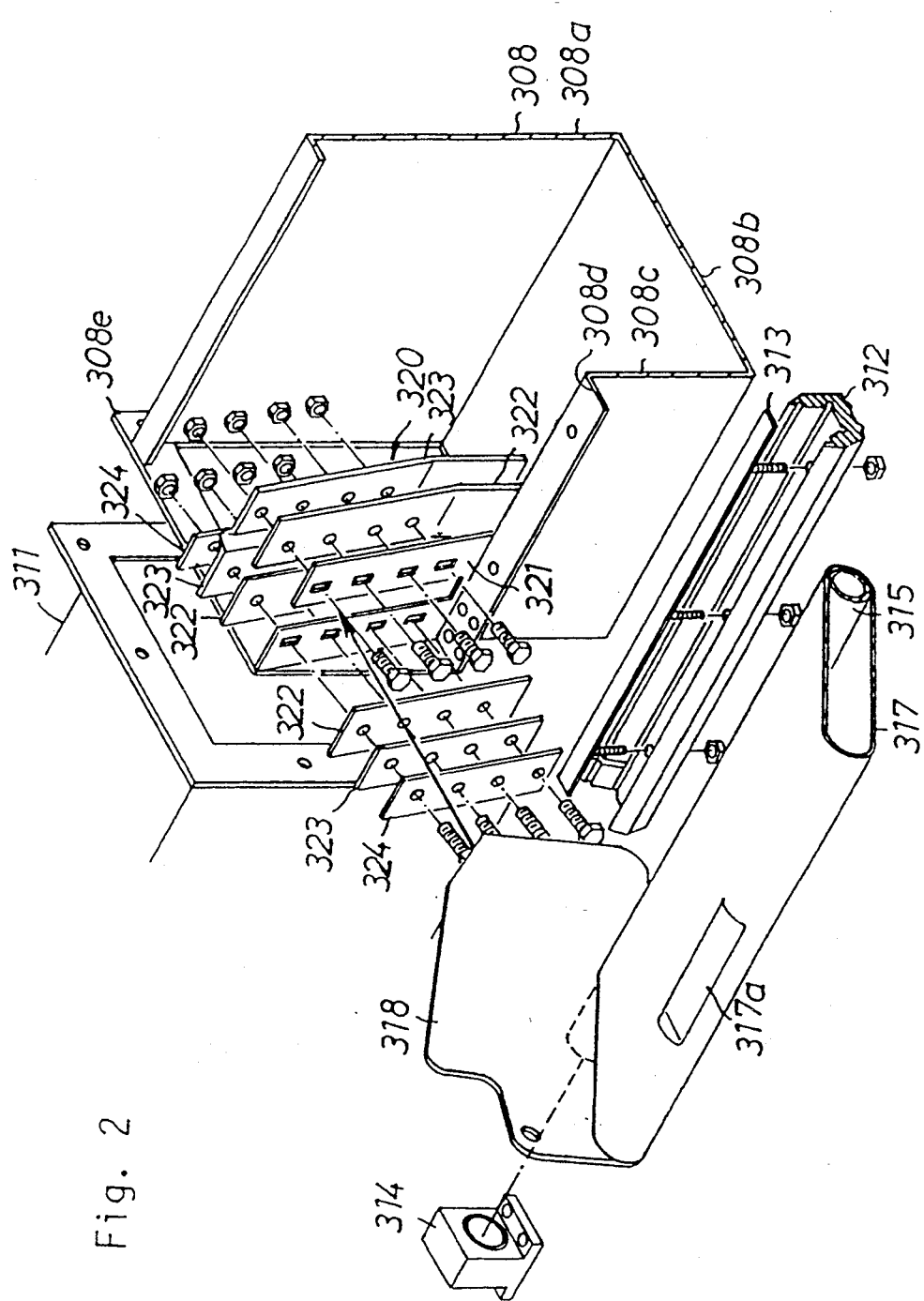
FIG. 2 is an exploded view of a sealing means used in the scum removal apparatus shown in FIG. 1.

It is to be noted that, as shown in FIG. 1, a shaft X may be mounted by a plurality of bearing (not shown) so as to extend parallel to the lengthwise direction of the sewage settling pool for rotation about the longitudinal axis thereof and that an auxiliary arm 328b may be connected to the shaft X so as to extend perpendicular thereto while a follow-up member 328a having a free end provided with a plurality of corrugations is fitted to a free end of the arm 328b. In such case, when the roller 305 approaches, the follow-up member 328a is selectively shifted upwardly and downwardly about the shaft X to thereby cause the weir member 317 to be elevated and lowered by a transmission mechanism with respect to the fluid surface level 306.

Figure 6:
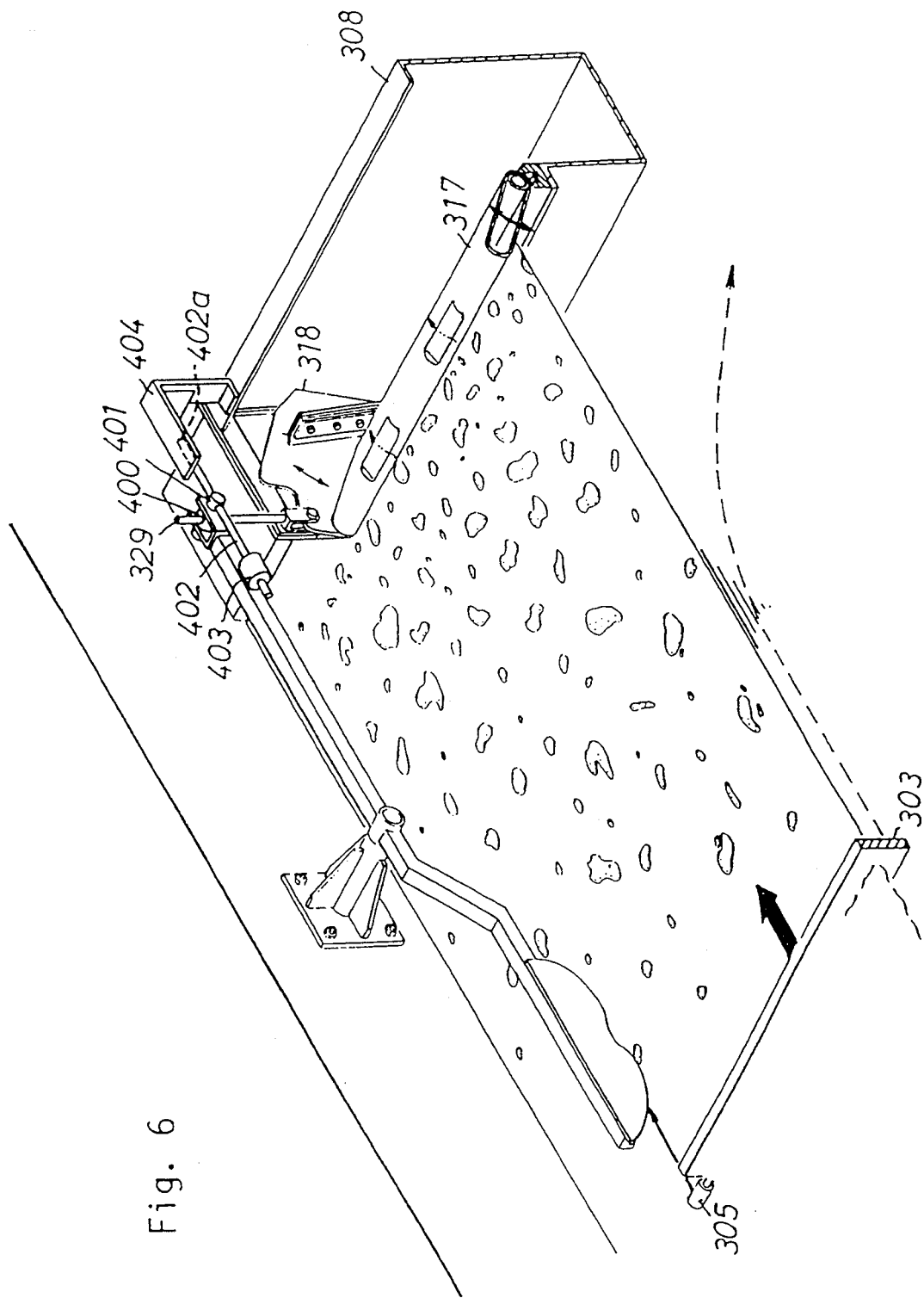
FIG. 6 is a fragmentary perspective view showing one example of the scum removal apparatus of a water-level follow-up type.
Figure 7:
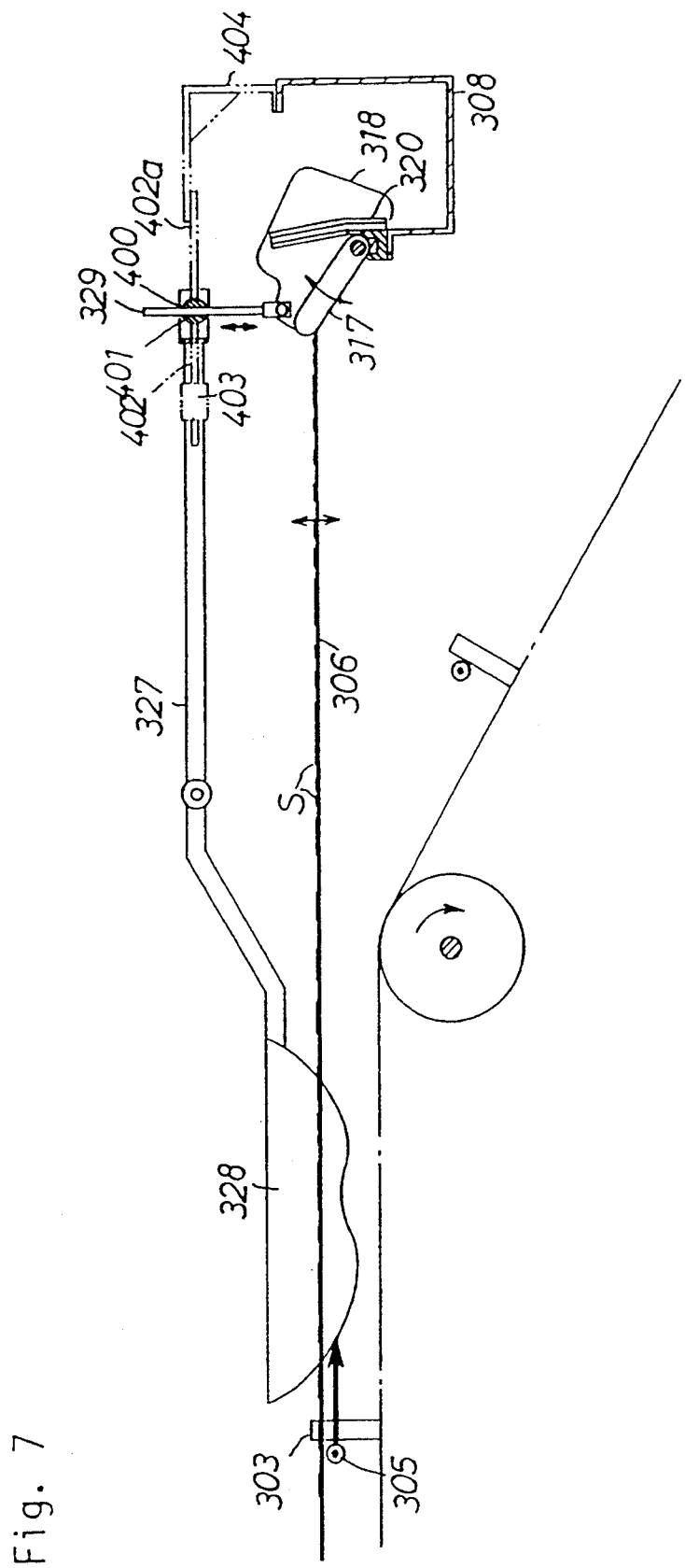
FIG. 7 is a schematic side sectional view of a portion of the scum removal apparatus of the water-level follow-up type, showing a condition before the scum is drawn.
Figure 8:
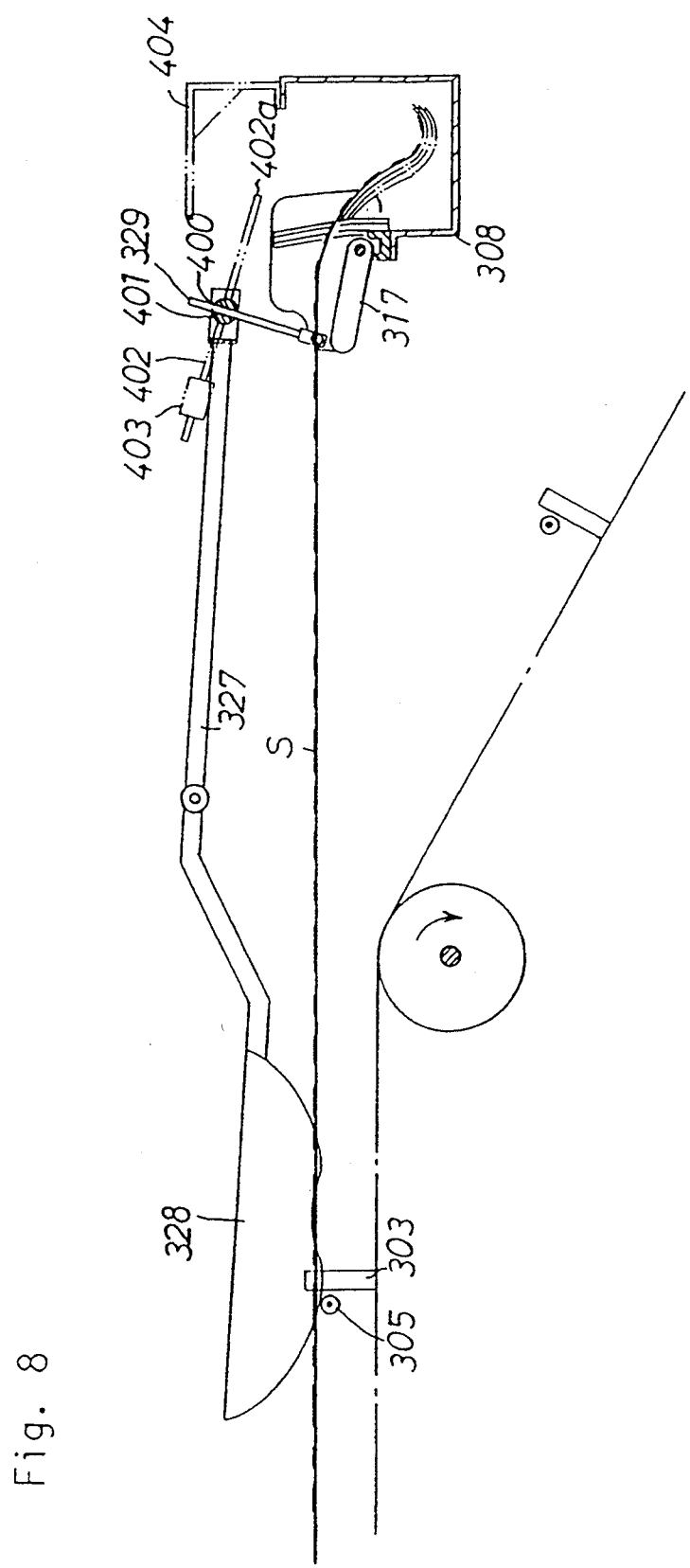
FIG. 8 is a schematic side sectional view of the portion of the scum removal apparatus of the water-level follow-up type, showing another condition during the drawing of the scum.

FIGS. 6 to 8 illustrate the scum removal apparatus of a water-level follow-up type wherein the height of the weir member 317 can be automatically adjusted in response to a change in position of the fluid surface level 306 and which is operable to remove the scum in a manner similar to that described above. In this embodiment, like parts are designated by like reference numerals except for some of them. In this scum removal apparatus, the operating arm 327 has a rear end fitted with a shaft 401 having an elongated hole 400 through which the rod 329 is inserted.

This shaft 401 has an arm 402 connected thereto so as to extend perpendicular thereto, said arm 402 having a front end mounted with a balancer 403 and a rear end adapted to engage a generally L-shaped stopper 404 mounted on the trough 308.

Before the roller 305 is brought into abutment with the follow-up member 328, the rear end 402a of the arm 402 is engaged with the stopper 404 to keep the arm 402 substantially horizontally and, therefore, the elongated hole 400 lies vertically. The rod 329 can move up and down through the elongated hole 400 and, accordingly, when the weir member 317 attempts to move up and down in response to a change in fluid surface level, the rod 329 independently moves up and down relative to the elongated hole 400 in the arm 402 then held at a predetermined position, thereby accommodating the change of the fluid surface level.

After the fluid surface level has changed, and when the roller 305 is brought into abutment with the follow-up member 328 as shown in FIG. 8, the rear end of the operating arm 327 shifts downwardly causing the arm 402 to disengage from the stopper 404 and, at the same time, the shaft 401 is twisted by the action of the balancer 403, resulting in that the rod 329 is trapped in the elongated hole 400. As a result thereof, the rod 329 is lowered from the operating arm 327 through the shaft 401 to depress the weir member 317 downwardly. When the rod 329 subsequently returns to assume a vertical position after having transmitted the up and down movement, it can freely move vertically within the elongated hole 400 to pursue the fluid surface level.

FIGS. 9 and 10 illustrates an another embodiment of the scum removal apparatus of the water-level follow-up type. This scum removal apparatus includes an engagement plate 410 secured to an outer side of the end plate 318, said engagement plate 410 having a plurality of engagement grooves 410a defined in an outer peripheral portion and being rotatable about a rotary shaft 315 in synchronism with the weir member 317. A guide plate 411 protrudes outwardly from the front wall of the trough 308 and is provided with a guide portion spaced a slight distance from and confronting the outer peripheral portion of the engagement plate 410.

On the side of the operating arm 327, a rod 413 having a balancer 412 is suspended. A free end of the rod 413 adjacent the trough 308 is provided with an engagement pin 414 positioned above the engagement plate 410 so as to protrude laterally downwardly therefrom for engagement with any one of the engagement grooves 410a.

When the operating arm 327 is held still in a generally horizontal position as shown in FIG. 9, the engagement pin 414 is disengaged from and positioned above the engagement plate 410 and, therefore, both of the weir member 317 and the engagement plate 410 move to follow a change in fluid surface level. Even though the engagement plate 410 rotates, the engagement pin 414 can be engaged in any one of the engagement grooves 410a since the engagement plate 410 is formed with the plural engagement grooves 410a in its outer peripheral portion.

After the movement to follow up the change of the fluid surface level, and when the operating arm 327 subsequently operates as shown in FIG. 10, the rod 413 is lowered with the engagement pin 414 brought into engagement with any one of the engagement grooves 410a. Thereafter, the engagement plate 410 is pivoted through the rod 413. Although it may happen that the engagement between the engagement pin 414 and any one of the engagement grooves 410a may be disengaged if the angle of rotation is too great, the guide plate 411 serves to avoid this possibility. When the operating arm 327 is returned to the initial position, the engagement of the engagement pin 414 with one of the engagement grooves 410a is automatically disengaged as well and the operating arm 327 is held in position to pursue the fluid surface level. It is to be noted that the engagement grooves 410a may be formed on an outer peripheral portion of the end plate 318.

FIGS. 11 to 15 illustrate an additional example designed in association with the same scum removal apparatus, in which it is suggested a simple method of assuredly connecting a connecting trough 500, extending through the side wall 310 of the sewage settling pool, with a trough 515. Although the connecting trough 500 is basically a tubular member of a generally rectangular cross-section, it has an upper wall existing only at a generally intermediate portion thereof with its side portions cut away to provide openings 501. This is for the purpose of permitting the trough 515 to be passed from above in the manufacturing process.

The connecting trough 500 includes a plurality of rear nuts 502 positioned inwardly of the opening thereof and also provided with a generally U-shaped seal receiving member 503 disposed on an inner peripheral portion of each axial end portion of the connecting trough 500, a sealing member 504 being snugly fitted into the seal receiving member 503. Also, L-shaped bracket 505 for receiving a channel member is secured to the outer peripheral portion of each axial end of the connecting trough 500. A plurality of stud bolts 506 are secured to an inner surface of the bottom of the connecting trough 500, some of said stud bolts 506 having nuts 507 threadingly mounted thereon.

This connecting trough 500 fixedly extends through a bore 508 defined in the side wall 310 with mortar 509 filling up a gap between the outer periphery of the connecting trough 500 and the wall defining the bore 508. In installing the connecting trough 500, care must be taken that each opening 501 of the connecting trough 500 must be positioned outside the side wall 310 of the sewage settling pool and that mortar 510 should be filled inside the connecting trough 500 so as to conceal respective heads of the stud bolts 506. This is for the purpose of the liquid component containing the scum can smoothly flow through the connecting trough 500 without being disturbed by the presence of steps between the bottom wall of the trough 515 and that of the connecting trough 500. The nuts 507 are utilized to adjust an upper surface of the mortar 510 to be in level with the bottom of any one of the neighboring inclined troughs 515 when the connecting trough 500 is desired to be inclined so that the liquid component containing the scum can flow by gravity from one trough 515 to the neighboring trough 515 through the connecting trough 500.

The trough 515 is of a structure having its opposite end portions of a closed generally rectangular cross-section and its intermediate portions opening upwardly and also partially frontwardly. The end portion of the trough 515 is provided with perforated projecting pieces 516 secured thereto so as to protrude laterally outwardly therefrom, with the connecting trough 500 inserted into the trough 515 through the opening 501. When inserting the end portion of the trough 515 into the connecting trough 500, a sealing member 504 is interposed between the walls of the connecting trough 500 and the walls of the respective trough 515.

Figure 17:
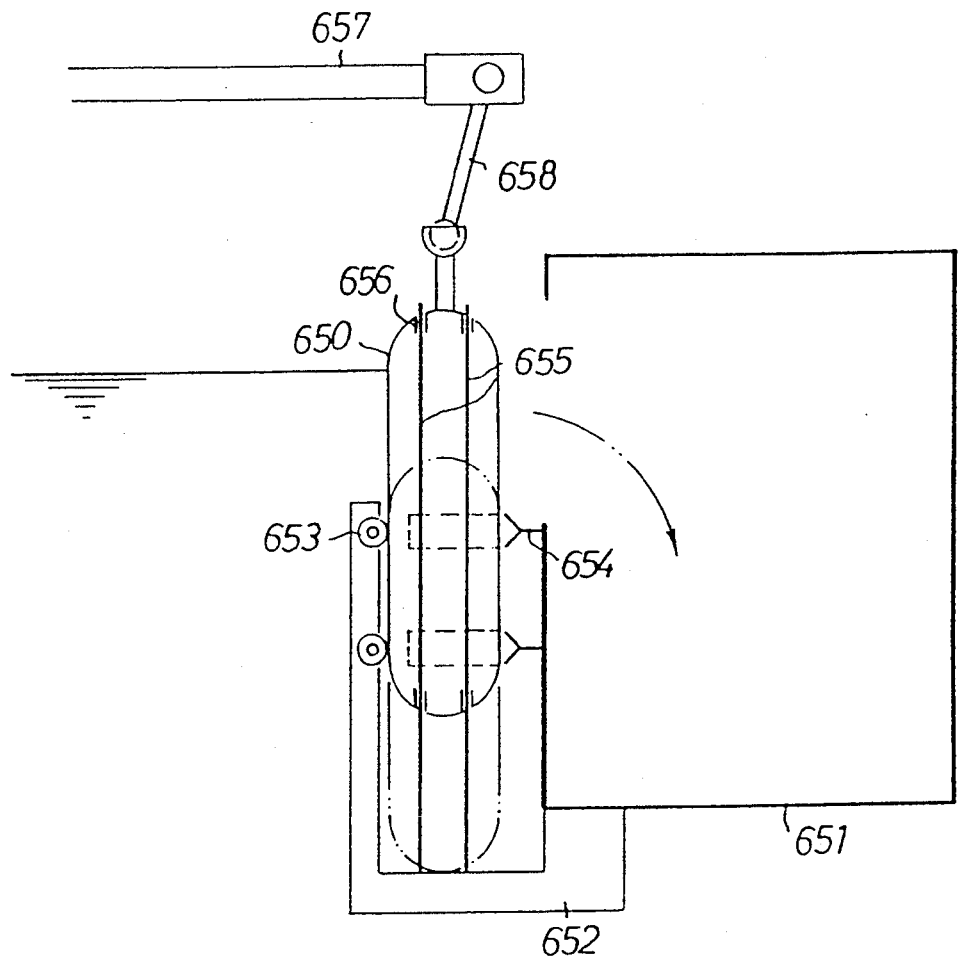
FIG. 17 is a schematic side view showing a vertically movable type of the weir member.

After the connection between each end portion of the connecting trough 500 and the corresponding end portion of each trough 515, a generally U-shaped retainer frame 517 is, as shown in FIG. 17, fixed to the end portion of the connecting trough 500 by bolts 502 with the trough 515 sealingly and fixedly retained by fastening bolts 519. Thereafter, each trough 515 and the connecting trough 500 are fixedly fastened together by tension bolts 518 extending between receiving members 505 and the projecting pieces 516.

Figure 11:
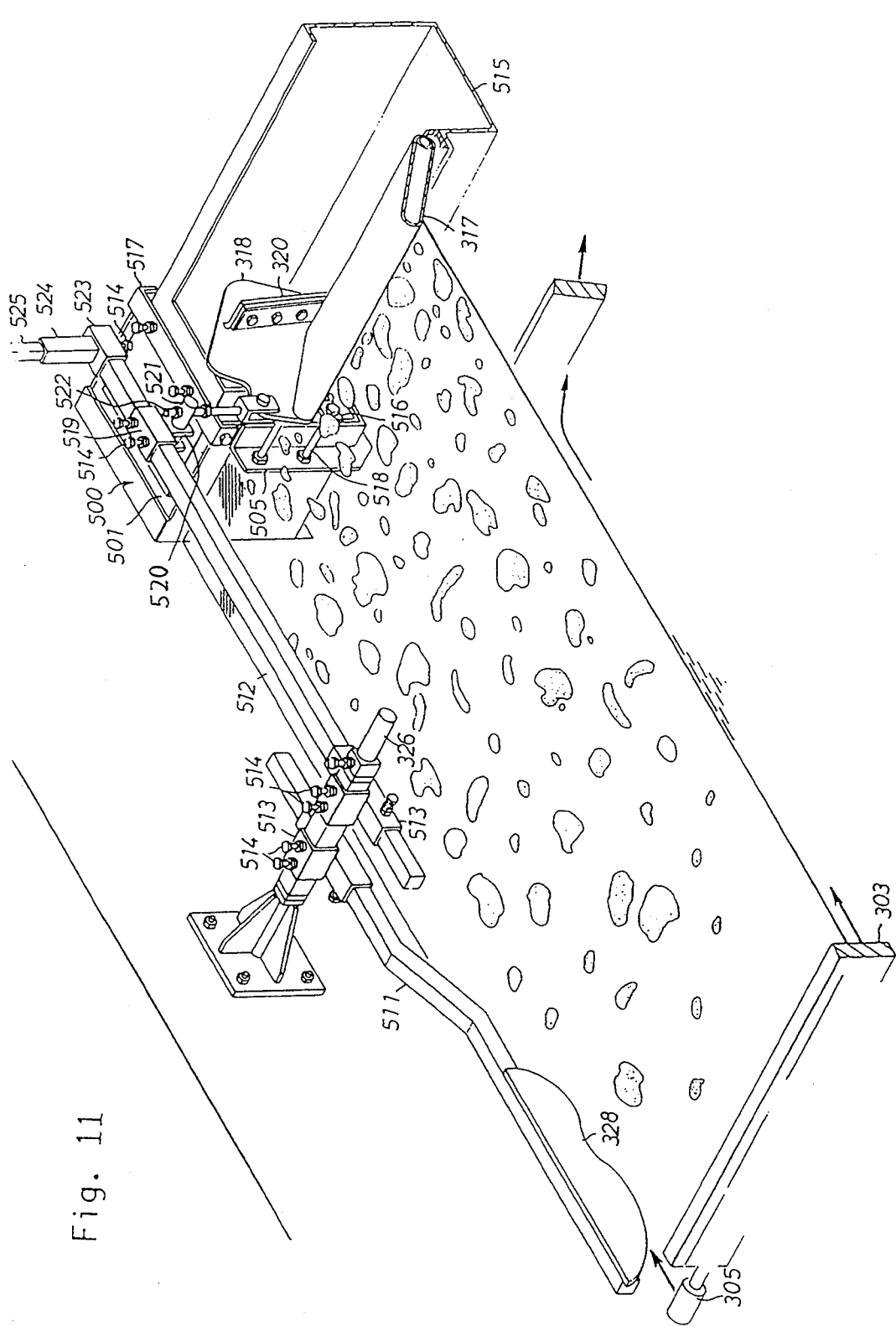
FIG. 11 is a fragmentary perspective view showing a novel example showing a rigid connection of a trough with a connecting trough.
Figure 12:
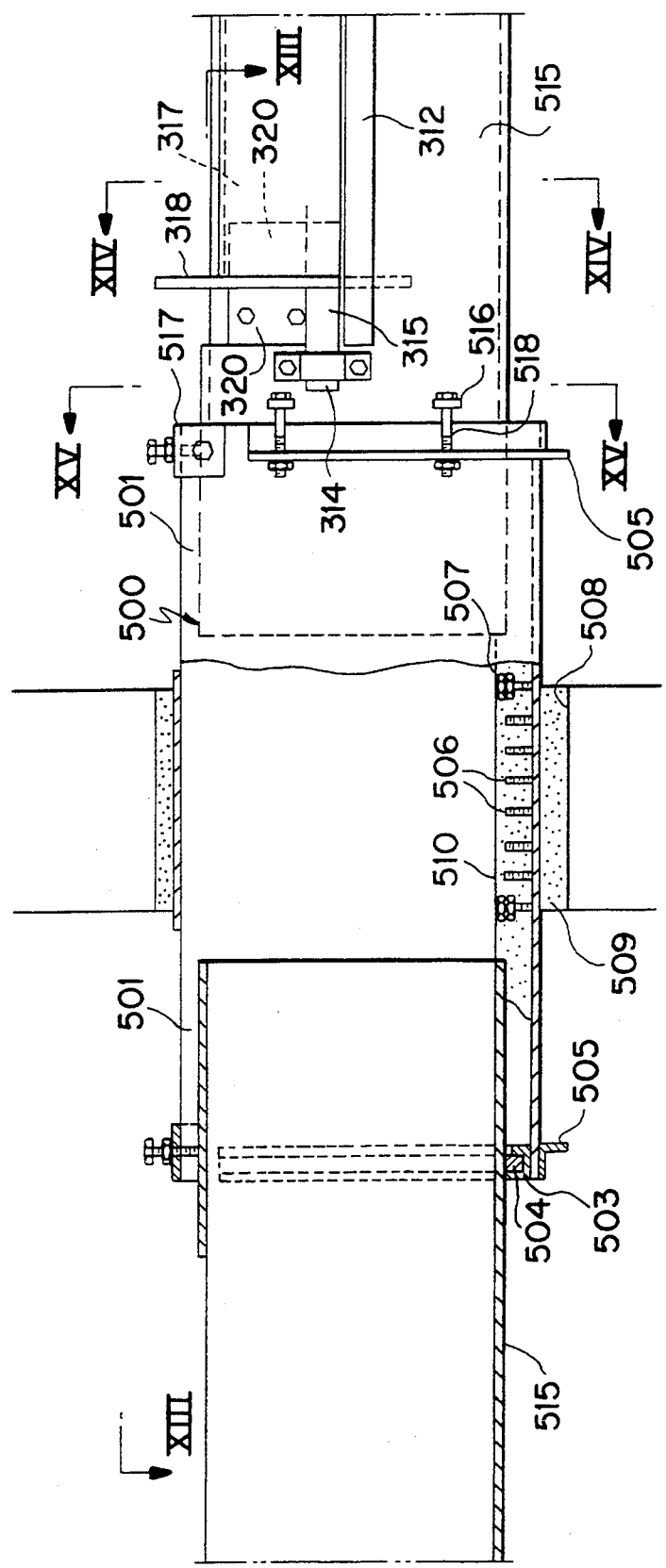
FIG. 12 is a sectional view, on an enlarged scale, showing an essential portion of the example shown in FIG. 11.
Figure 13:
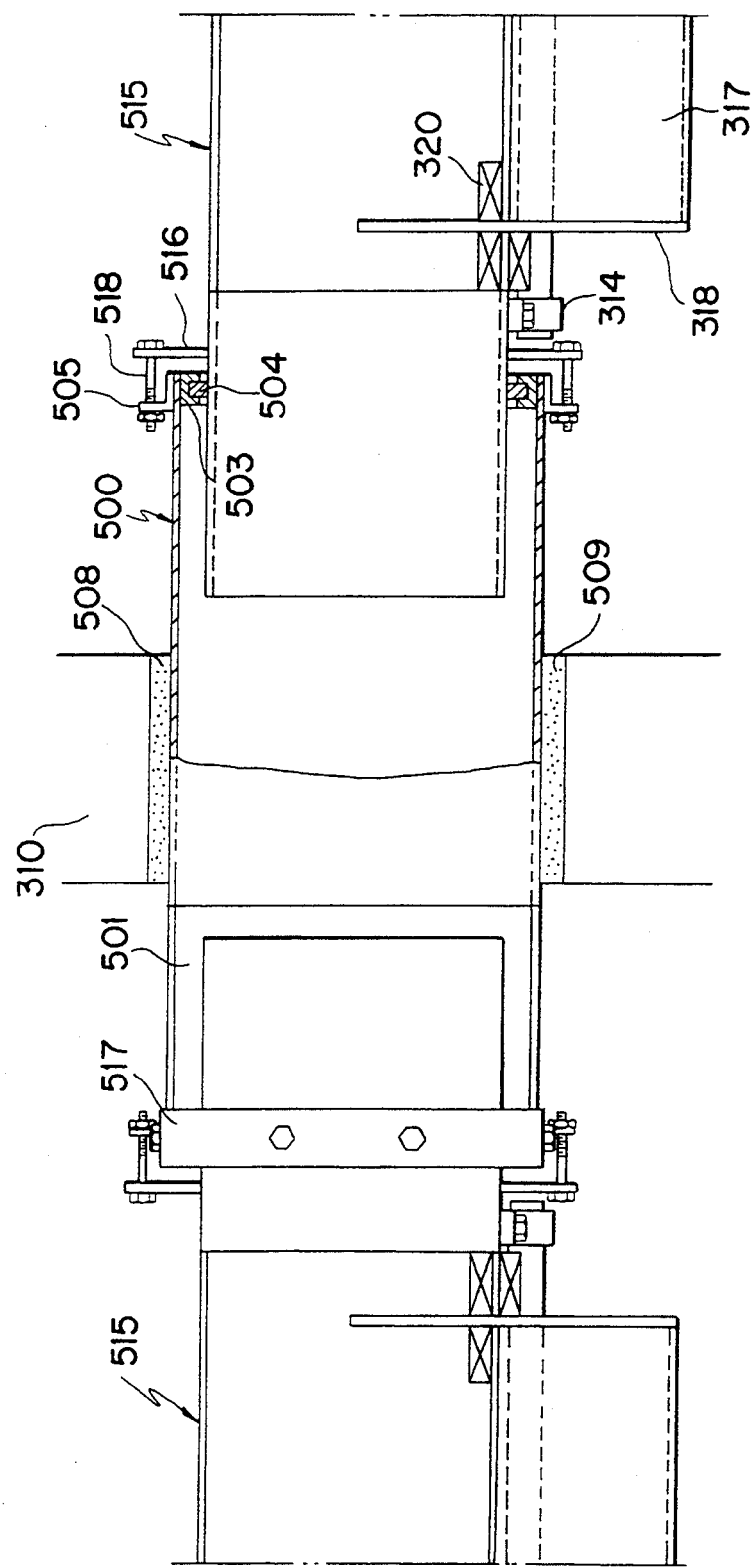
FIG. 13 is a cross-sectional view taken along the line B—B in FIG. 12.
Figure 14:
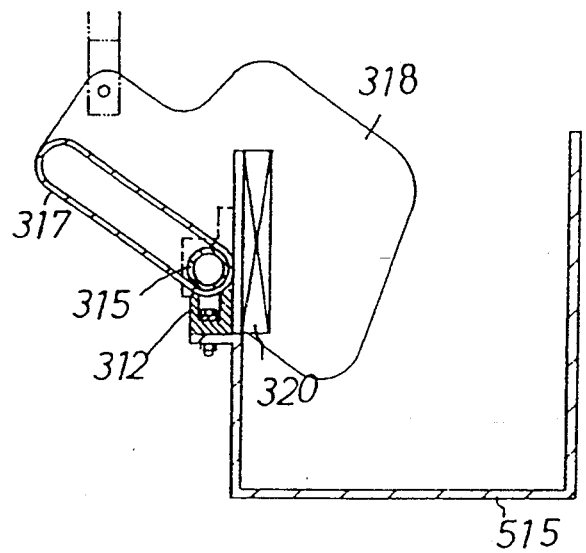
FIG. 14 is a cross-sectional view taken along the line C—C in FIG. 12.
Figure 15:
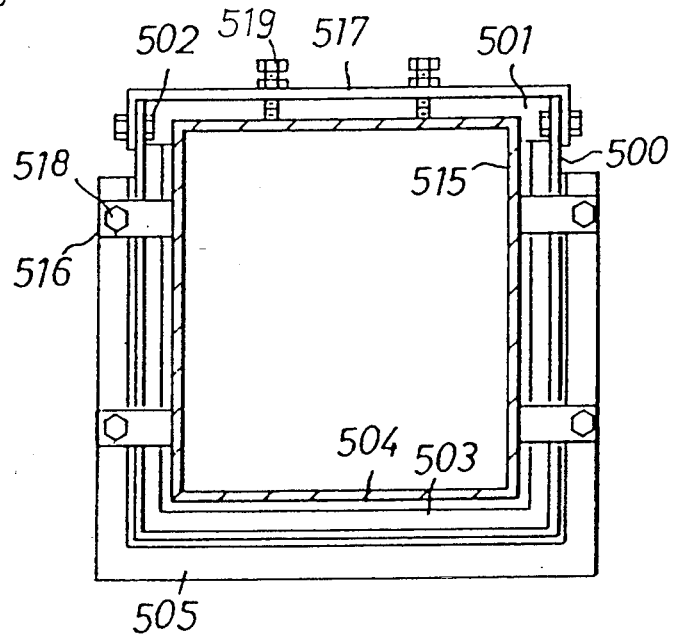
FIG. 15 is a cross-sectional view taken along the line D—D in FIG. 12.

It is to be noted that the operating arm is, as shown in FIG. 11, comprised of a first arm 511 and a second arm 512, which arms 511 and 512 are connected to the rotary shaft 326 through a transverse tube 513 by means of bolts 514 so that they can be adjustably shifted along any one of X-axis and Y-axis directions perpendicular to each other. It is also to be noted that the first arm 511 and the second arm 512 may be disposed in respective positions reverse to those shown. This is for the purpose of accommodating dimensional relationships with respect to the sewage settling pool. A slide tube 519 is axially slidably mounted on one end of the second arm 512 adjacent the trough 515 by means of adjustment bolts 514, said slide tube 519 having a bottom provided with a shaft 521 which eccentrically protrude therefrom through a bracket 520. The rod 522 is connected to the slide tube 519 through the shaft 521. A distal end of the second arm 512 also has a slide tube 523 mounted thereon through bolts 514 so that a hand-operated handle 525 inserted in a tubular member 524 mounted on the slide tube 523 can be adjusted in position.

Figure 16:
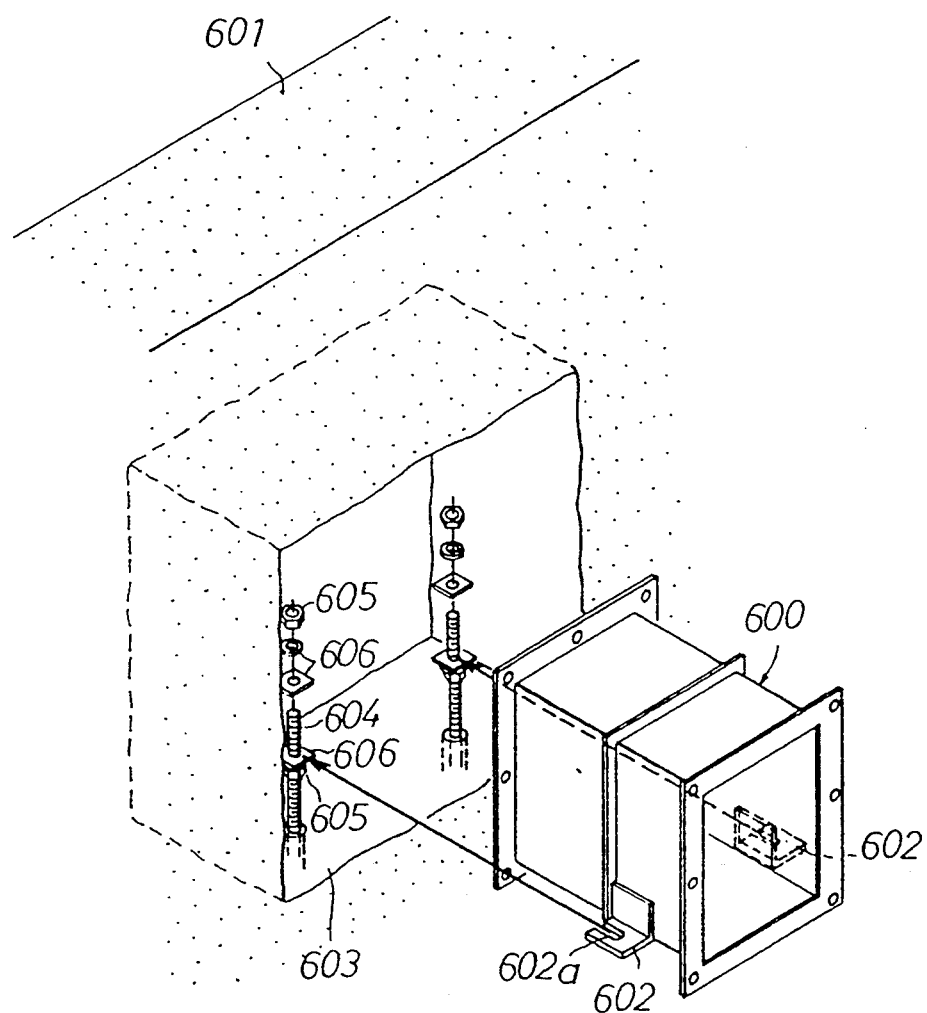
FIG. 16 is an exploded view showing another example of a method of connecting the connecting trough.

FIG. 16 illustrates another example of fixedly connecting a connecting trough 600 in a side wall 601 of the sewage settling pool. This connecting trough 600 includes a pair of fixtures 602 secured to a generally intermediate portion of the wall forming the connecting trough 600. Each of these fixtures 602 has an engagement groove 602a defined therein so as to open in one direction. On the other hand, a bottom wall defining a bore 603 in the side wall 601 is provided with two bolts 604 partially embedded in upright position so that corresponding plural nuts 605 and plural washers 606 can be mounted on each of them.

After the nuts 605 and the washers 606 have been set on each of the bolts 604 so as to define respective seats, the fixtures 602 are connected thereto with the engagement grooves 602a receiving the associated bolts 604 while seated against the seats. Then, after the connecting trough 600 has been mounted and set in position, the remaining nuts 605 and the remaining washers 606 are set on the bolts 604 to fix the connecting trough 600. With this connecting system, since it is an adjustable type, the level of the connecting trough 600 can be accomplished easily. It is to be noted that, after the connection of the connecting trough 600 to the side wall 601, a gap formed between the wall defining the connecting trough 600 and the wall defining the bore 603 is filled up by mortar to achieve a fluid tight seal.

FIG. 17 illustrates an example in which a weir member 650 having a generally elliptical cross-section (or of a generally oval cross-section) adapted to move up and down in a vertical direction in front of the trough 651. Stays 652 protrude from opposite end portions of a trough 651 with rollers 653 mounted in the stays in a longitudinal row. Generally Y-shaped sealing members 654 are secured to the front wall of the trough 651 so as to extend widthwise of the trough 651 and are so bent and so shaped as to extend to left-hand and right-hand sides of a weir member 650. Guide shafts 655 extend vertically from the stays 652, along which the weir member 650 moves up and down in sliding relation thereto. Upper and lower side portions of the weir member 650 have bushings 656 of nylon secured thereto.

When an operating arm 657 pivots downwards by the action of a follow-up member, the weir member 650 then floating is lowered beneath the fluid surface level through a rod 658 whereby the scum floating on the fluid surface level can be drawn towards the trough 651. On the other hand, when the operating arm 657 returns to the initial position, the weir member 650 floats by the effect of its own buoyancy to halt the flow of the scum towards the trough 651.

Figure 18:
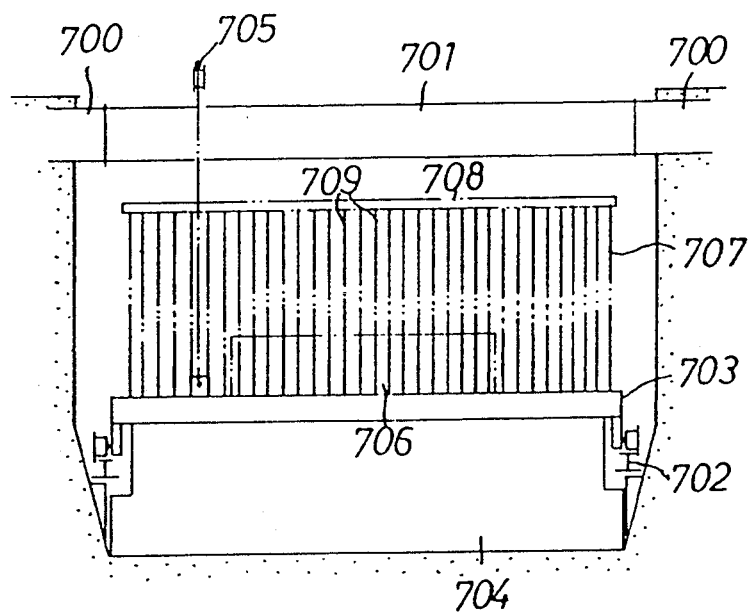
FIG. 18 is a schematic front elevational view showing an example in which the scum removal apparatus is operatively associated with a mud scraping device.

FIG. 18 illustrates an additional example in which, in the scum removal apparatus comprising a trough 701 fixed between connecting troughs 700 and a weir member positioned in front of the trough 701, the up and down movement of the weir member relative to the fluid surface level is carried out by the utilization of a driving power delivered from a sediment or mud scraping device. More specifically, reference numeral 702 represents rails disposed on left-hand and right-hand portions of the bottom of the sewage settling pool along which a carriage 703 can reciprocatingly move in a direction lengthwise perpendicular to the plane of the drawing, that is in a direction lengthwise of the sewage settling pool. The carriage 703 includes a sediment scraping plate 704 so designed and so structured as to successively scrape sediment, settling on the bottom of the sewage settling pool, towards a pit. While this operation is well known as accomplished by a drive motor (not shown) and a rope 705, this example intends to utilize a driving power delivered therefrom for the scum removal apparatus. For this purpose, the movement of the rope 705 is taken out of the sewage settling pool and is utilized to drive the weir member to move up and down with respect to the fluid surface level. It is, however, to be noted that the carriage 703 is provided with a storage casing 706 which may contain earthworms or biological agents for decomposing the sediment. Alternatively, arrangement may be made to blow air from any suitable site to achieve an aeration. Also, the carriage 703 may have columns 707 mounted thereon for connection with a transverse frame 708 and ropes 709 or any other rod members are suspended between the carriage 703 and the transverse frame 708 to facilitate settlement of the sewage.

Figure 19:
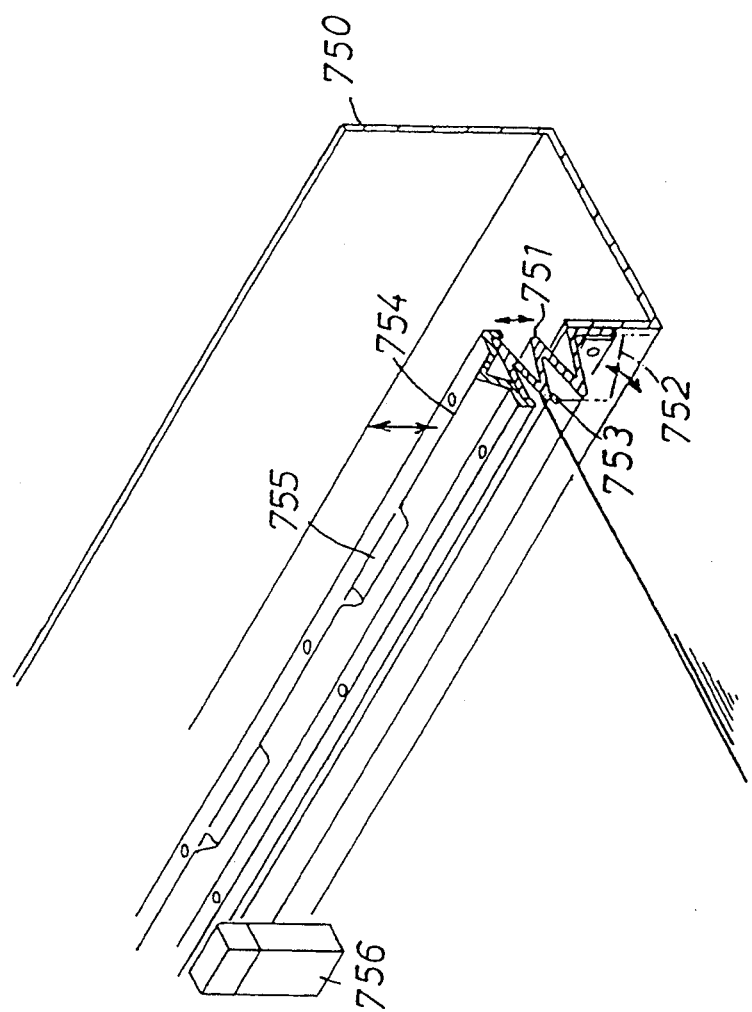
FIG. 19 is a partially sectioned perspective view showing an additional example of the weir member of a soft expandable type.

FIG. 19 illustrates an additional suggestion in which a telescopically expandable weir member 751, expandable in a vertical direction and having a generally W-shaped cross-section, is fitted to the front wall of a trough 750. This weir member 751 is of an elongated configuration extending widthwise of the trough 750 and is made of soft material such as plastics or rubber. A fluid pressure preventive covering 752 is provided frontwardly of the weir member 751 and is reversible upside down about a hinge 753 to clean the weir member 751. A reinforcement plate 754 is fitted atop the weir member 751, through which plate 754 can the weir member 751 be selectively expanded and contracted by operation of a transmission mechanism. This reinforcement plate 754 has a plurality of recesses 755 defined at appropriate locations for receipt of large scum lumps and also has an auxiliary float 756 secured to a front portion thereof for stabilizing its operation.

Figure 20:
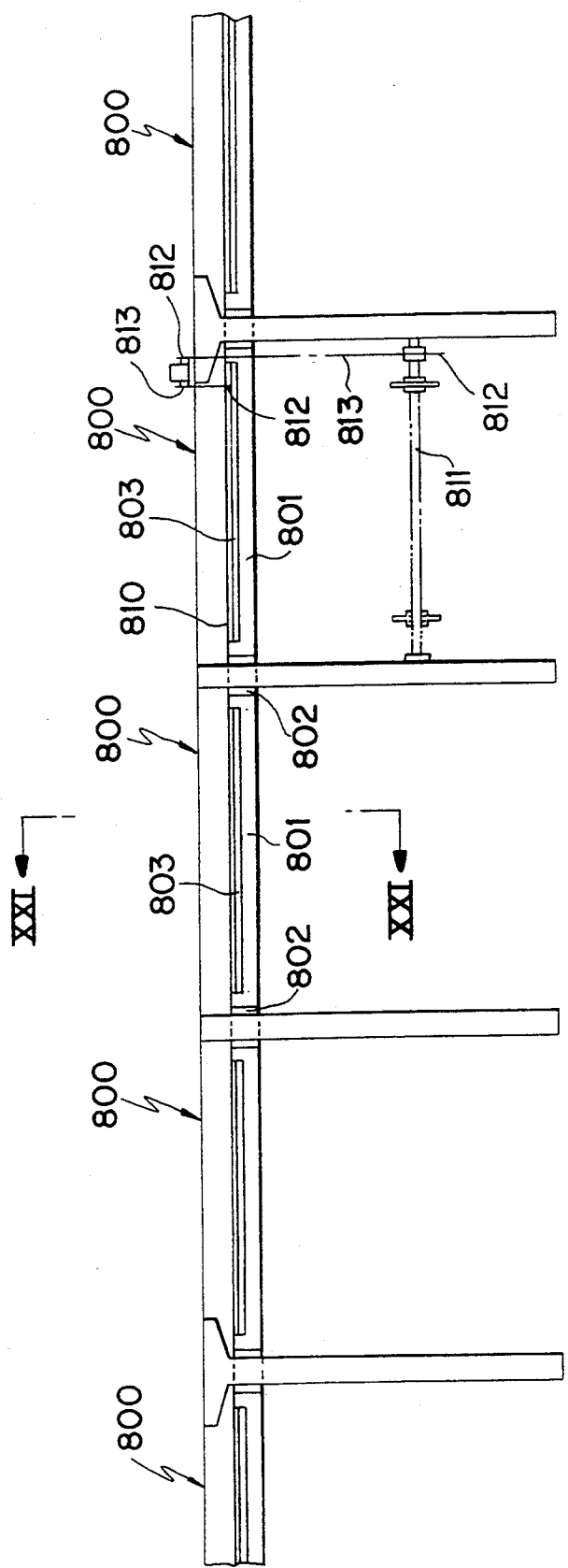
FIG. 20 is a longitudinal sectional view showing another drive mechanism for the weir member.
Figure 21:
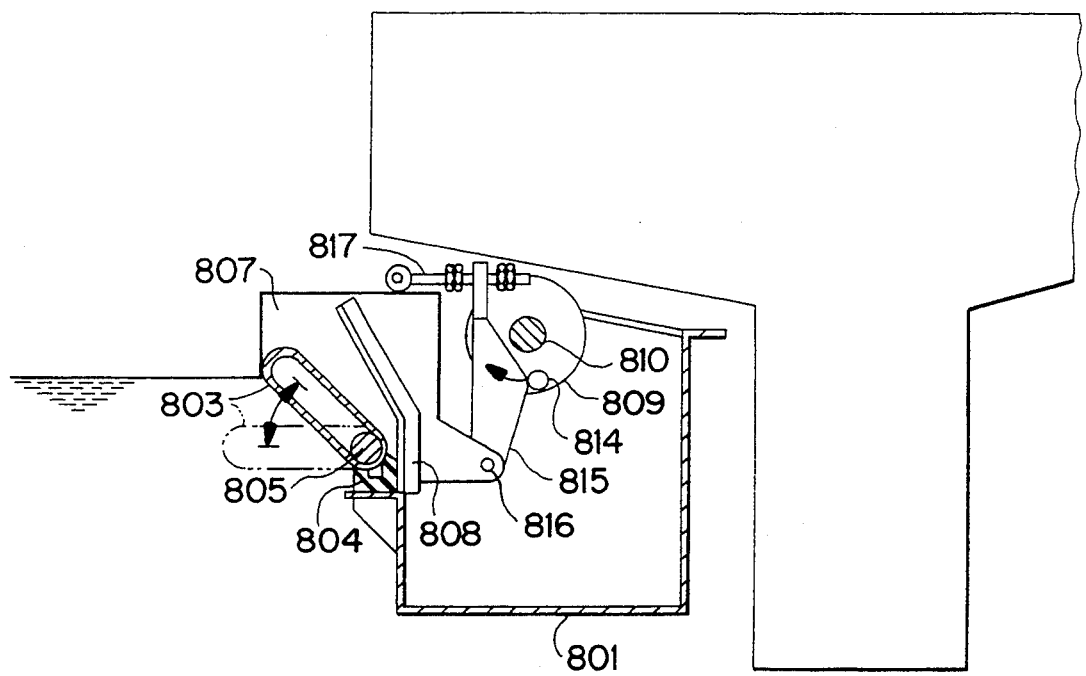
FIG. 21 is a cross-sectional view taken along the line E—E in FIG. 20.
Figure 22:
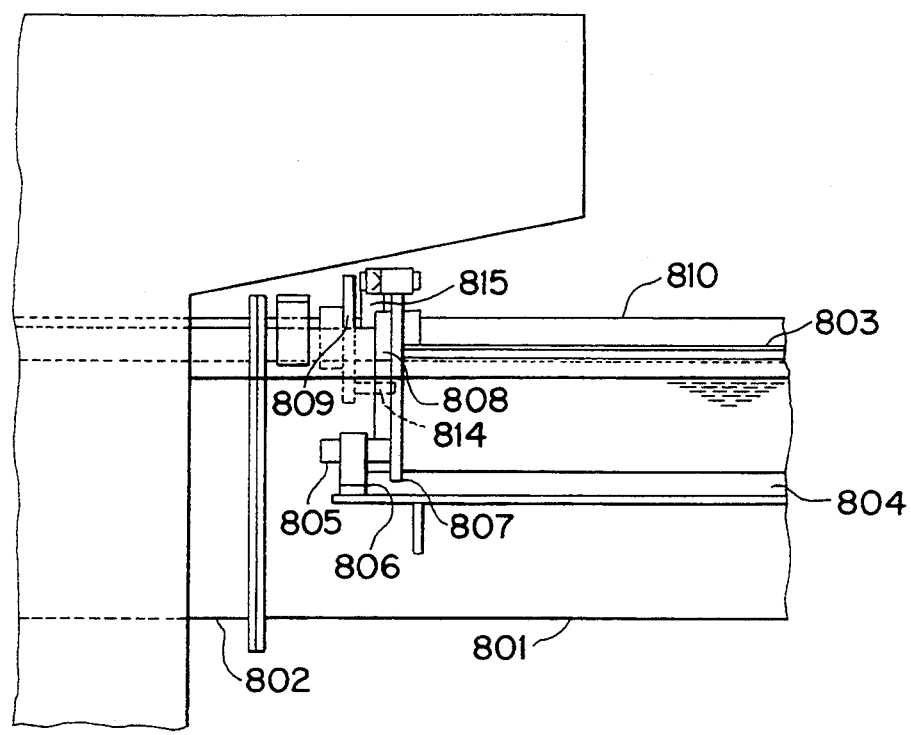
FIG. 22 is a sectional view, on an enlarged scale, of a portion of the drive mechanism shown in FIG. 20.

FIGS. 20 to 22 illustrate a further additional example. A plurality of sewage settling pools 800 are arranged in side-by-side relationship with each other, one side of each sewage settling pool being communicated with the next sewage settling pool through respective troughs 801 that are fluid-connected with each other through a respective connecting trough 802 as is the case in the previously discussed embodiment, said troughs 801 and said connecting troughs 802 being so inclined slightly that the water component containing the removed scum can flow from one sewage settling pool to the next adjacent sewage settling pool. As is the case with the previously discussed embodiment, a hollow weir member 803 of a generally elliptical cross-section having its bottom side sealed by a sealing member 804 in FIG. 21 is supported by the front wall of each trough 801 for movement up and down, a pivotal movement of the weir member 805 being accomplished by causing opposite ends of a rotary shaft 803, extending through the weir member 803, to be rotatably supported by bearings 806 in FIG. 22.

Opposite ends of the weir member 803 in each of the sewage settling pool 800 have respective sealing plates 807 secured thereto for rotation together with the weir member 803. The sealing plates 807 secured to the opposite ends of the weir member 803 cooperate with respective seal receptacles (side seals) 808, one on each end of the trough 801, to define a sealed structure. A front portion of the trough 801 opens in the form of a generally U-shaped opening, and when the weir member 803 is brought to a position beneath the fluid surface level, the water component containing the scum having overflown the weir member 803 can be drawn into the trough 801 through this opening.

In this example, if the plural weir members 803 for the sewage settling pools 800 are driven in synchronism with each other, the water component containing scum in all of these sewage settling pools can be simultaneously drawn into the respective troughs 801 and, at a distal end of the trough 801, an overflow of the water components may occur to such an extent as to result in an excessive supply of the water component to a scum separating machine installed in the next successive treatment site.

To alleviate this possible problem, this example has been conceived. More specifically, as shown in these figures, a single drive shaft 810 connected together with the neighboring one by connecting tube is disposed within the troughs 801 and the connecting troughs 802 and is driven by the utilization of a driving force in the sediment scraping device by training an endless chain 813 in FIG. 20 between a sprocket wheel 812, mounted on an intermediate shaft 811 used for driving the chain 813, and a sprocket wheel 812 mounted on the drive shaft 810.

Respective outer peripheral portions of the drive shaft 810 which are positioned within the associated troughs 801 are, as shown in FIG. 21, provided with rotary plates 809, each of said rotary plates 809 having a drive pin 814 secured thereto so as to protrude outwardly therefrom while a cam plate 815 is secured to each sealing plate 807 for receiving the respective drive pin 814. The cam plate 815 and the sealing plate 807 for each trough 801 are pivotally connected together by means of a respective pin 816 at a lower portion so that, by adjusting an adjustment bolt 817 at an upper portion, the angle between the cam plate 815 and the sealing plate 807 can be adjusted.

Although the drive pin 814 associated with the illustrated trough 801 is held at such a position as shown, the drive pin 814 associated with the neighboring trough 801 is offset a predetermined angle relative to the drive pin 814 associated with the illustrated trough 801. In other words, where the number of the sewage settling pools 800 is ten, the drive pins 814 associated with these ten sewage settling pools 800 are offset from each other an angle of 360 degrees divided by the number of the sewage settling pools 800, that is, 36 degrees.

Accordingly, when the drive shaft 810 is driven by the utilization of the driving power delivered from the intermediate shaft 811, the derive pin 814 at one end of the sewage settling pool 800 pushes the associated cam plate 815 forwardly to press the weir member 803 down until it comes beneath the fluid surface level. At the time this weir member 803 is moved a certain distance forwardly, the drive pin 814 in the neighboring trough 801 actuates the associated cam plate 815 to actuate the corresponding weir member 803. In this way, at intervals of a predetermined time, the weir members 803 are successively actuated. As a result thereof, the water component containing the scum will not be drawn into all of the troughs 801 at a time and, therefore, the previously discussed problem is alleviated. The weir members 803 return to the initial position above the fluid surface level by the effect of their own buoyancy. Also, there is a case in which no driving power is taken from the intermediate shaft 811 and it may be so constructed as to be driven by a dedicated motor. Furthermore, each of the drive pins 814 may have a roller mounted thereon.

Figure 23:
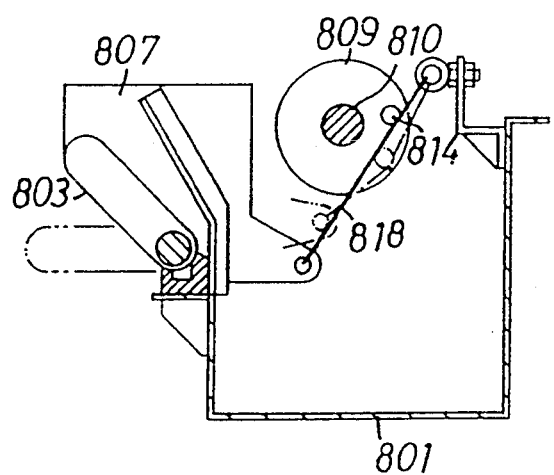
FIG. 23 is a longitudinal sectional view showing a different drive mechanism for the weir member.

In the meantime, in association therewith, another additional example is also suggested as shown in FIG. 23. In this example, the trough 801 and the lower end of the sealing plate 807 are connected together by means of a wire 818 so that the wire 818 can undergo a pushing action from a linear condition to a deformed condition in response to rotation of the drive pin 814. In this way, the wire 818 rotates the sealing plate 807 in a forward direction to depress the weir member 803 and, therefore, the weir member 803 can be lowered beneath the fluid surface level.

Figure 24:
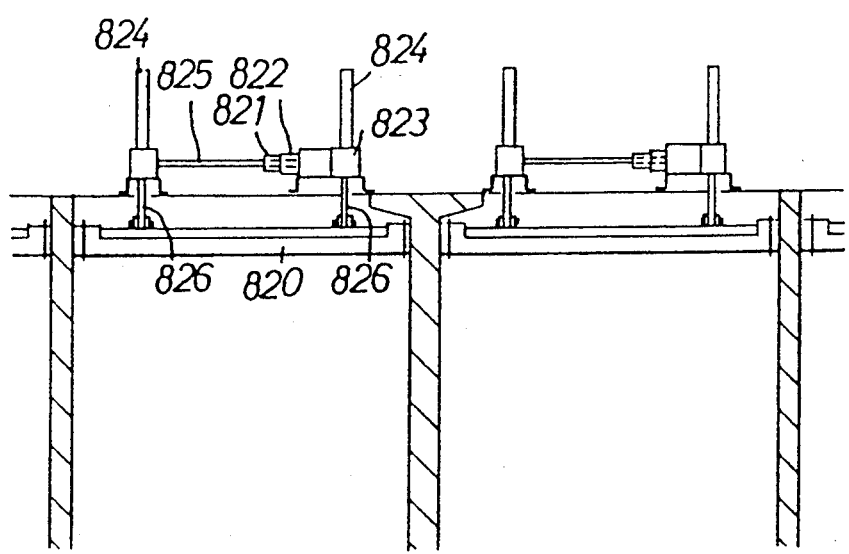
FIG. 24 is a longitudinal sectional view showing a further different drive mechanism for the weir member.
Figure 25:
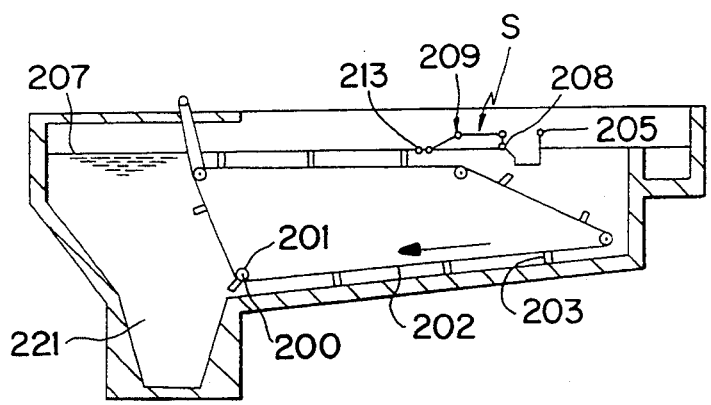
FIG. 25 is a fragmentary perspective view showing one example of the conventional scum removal apparatus.
Figure 26:
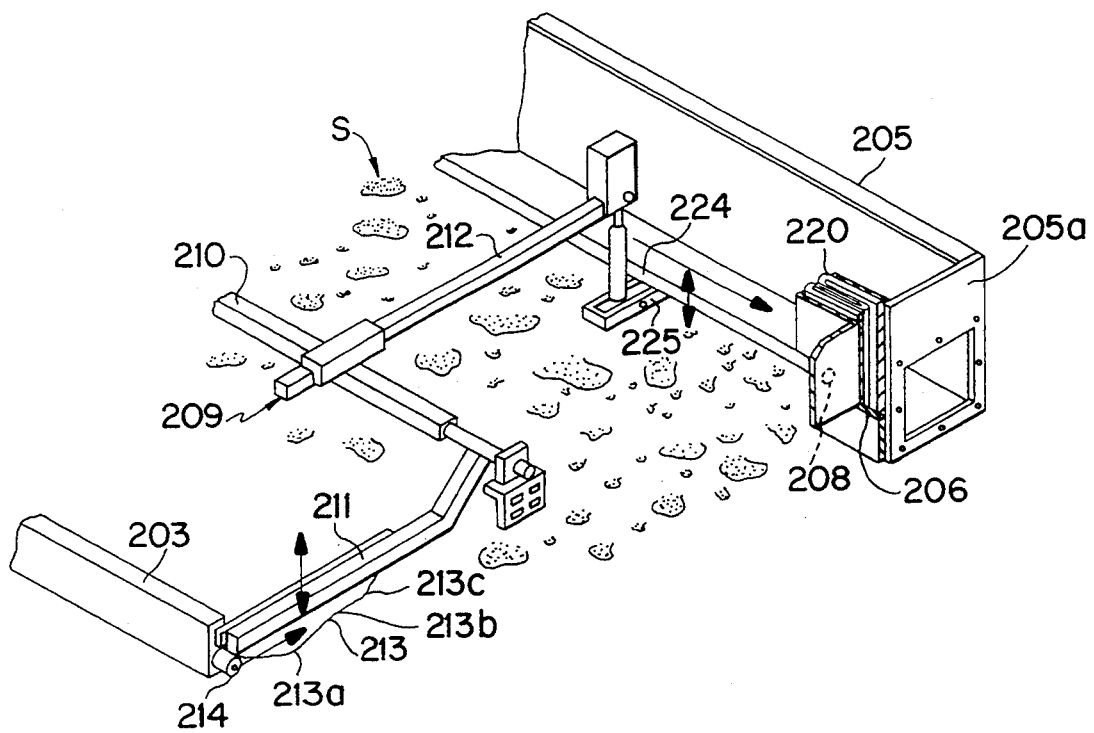
FIG. 26 is a schematic perspective view of the conventional scum removal apparatus shown in FIG. 25.

A different example is suggested in FIG. 24. In this example, the weir members 820 are adapted to be driven respective sets of devices. In such case, reference numeral 821 represents a motor, and reference numeral 822 represents a reduction gear unit, output shafts of them being provided with worm gears within a gear box 823. From these gears, a force is transmitted to a gear perpendicular thereto, and the rotation of this gear causes a screw shaft within an upright tube 824, perpendicular thereto, to move up and down. The up and down movement of the screw shaft is transmitted to an operating shaft 826 causing the weir member 820 depressed at one side. Also, a force is transmitted to the next gear box 823 through a connecting shaft 825, and the weir member 820 at the other side is depressed by means of the screw shaft and the operating shaft 826 of a similar construction. In this way, the weir member 820 can be uniformly depressed at the left-hand and right-hand ends and, therefore, a stabilized operating condition can be attained. This set is so constructed as to have a driving power source for each sewage settling pool.

INDUSTRIAL APPLICABILITY

As hereinabove described, the scum removal apparatus according to the present invention is installed in the initial or final sewage settling poor and is useful as a handy apparatus for removing and collecting scum floating on the fluid surface level. The present invention is so designed as to be applicable to all apparatuses operable to remove and collect the scum by the utilization of the driving power delivered from the existing movable member in the sewage treatment pool and can be manufactured very compact in size and at a reduced cost while satisfying the demands of each installability at site.

What is claimed is:

1. A scum removal apparatus comprising:
   a generally U-shaped sectioned trough fixedly installed in a sewage treatment pool with a lower portion of the trough submerged beneath a fluid surface level of the pool and with an upper portion emerging upwardly above the fluid surface level, said trough having an opening defined at one side thereof, said trough including means for discharging scum and a water component, which have been introduced into the trough through the opening;

a weir member operatively connected adjacent the opening of the trough for guiding and interrupting a flow of the scum and the water component into the trough;

a transmission mechanism for transmitting a force to the weir member for causing the weir member to undergo a rocking motion so that an upper side portion of the weir moves up and down with respect to the fluid surface and including a follow-up member including means for being actuated in contact with a drive unit provided in each of flights within the treatment pool;

said weir member being a hollow elongated member with front and rear sides;

a rotary shaft located in the weir member at a rear side, and means for operatively connecting the rotary shaft at the lower portion of the trough so that the weir can move in the up and down position.

2. The scum removal apparatus according to claim 1, wherein said weir further includes means for drawing large scum lumps.

3. The scum removal apparatus according to claim 2, wherein said means is a plurality of recesses.

4. The scum removal apparatus according to claim 3, wherein said recesses are located at the front side.

5. The scum removal apparatus according to claim 1, wherein said weir member has a rounded rear side.

6. A scum removal apparatus comprising:

a generally U-shaped sectioned trough fixedly installed in a sewage treatment pool, with a lower portion of the trough submerged beneath a fluid surface level of the pool and with an upper portion of the trough emerging upwardly above the fluid surface level, said trough having an opening defined at one side thereof, said trough including means for discharging scum and a water component, which have been introduced into the trough through the opening;

a weir member operatively connected adjacent the opening of the trough for guiding and interrupting a flow of the scum and the water component into the trough;

a transmission mechanism for transmitting a force to the weir member for causing the weir member to undergo a rocking motion so that an upper side portion of the weir moves up and down with respect to the fluid surface and including a follow-up member including means for being actuated in in contact with a drive unit provided in each of flights within the treatment pool;

one side of the trough adjacent the opening is provided with a rotary shaft extending parallel to the fluid surface level and operatively connected to the weir to permit the weir member to move up and down;

said weir member being a generally elongated member having an elliptical cross-section with opposite ends of the weir having respective end plates; and means for sealing connected to said trough with the end plates sandwiching between them said sealing means.

7. The scum removed apparatus according to claim 6, wherein said shaft extends through said end plates.

8. The scum removal apparatus according to claim 7, wherein ends of said shaft are located in bearings.

* * * * *